United States Patent [19]
Snyder et al.

[11] Patent Number: 5,954,936
[45] Date of Patent: Sep. 21, 1999

[54] ROBUST TECHNETIUM REMOVAL METHOD AND SYSTEM

[75] Inventors: Thomas Stephen Snyder, Oakridge, Tenn.; David Charles Grant, Gibsonia, Pa.

[73] Assignee: Scientific Ecology Group, Inc., Oak Ridge, Tenn.

[21] Appl. No.: 08/818,484

[22] Filed: Mar. 14, 1997

[51] Int. Cl.[6] .................................................. C25C 1/06
[52] U.S. Cl. ...................... 205/594; 205/687; 205/702; 205/770; 205/771; 204/242; 204/647
[58] Field of Search .................................. 205/594, 687, 205/702, 770, 771; 204/242, 647

[56] References Cited

U.S. PATENT DOCUMENTS

| 4,792,385 | 12/1988 | Snyder et al. | 204/140 |
| 5,156,722 | 10/1992 | Snyder at al. | 204/112 |
| 5,183,541 | 2/1993 | Snyder et al. | 204/105 |
| 5,217,585 | 6/1993 | Snyder et al. | 204/112 |
| 5,262,019 | 11/1993 | Snyder et al. | 204/105 |
| 5,439,562 | 8/1995 | Snyder et al. | 205/594 |

OTHER PUBLICATIONS

Dow Chemical U.S.A., *Idea ±Exchange*, "Demineralization of Organically Contaminated Waters", 8 (1), 8 pages (no date).

Waitz, W.H., Jr., *Amber–Hi–Lites*, "Recovery of Precious Metals with Amberlite Ion Exchange Resins", Rohm and Haas Company, Fluid Process Chemicals Department, 1982, 171, 5 pages.

Water Quality Monitoring, "Oxidation–Reduction Potential (ORP) or Redox Potential", 7.16, p. 209, and 1 sheet containing a diagram relating to Opacity–Orp from 1995 Buyers Guide.

Wildung, R.E. et al., *J. Environ. Qual.*, "Technetium Sources and Behavior in the Environment", 1979, 8 (2), 156–161.

*Primary Examiner*—Arun S. Phasge

[57] ABSTRACT

The invention provides a method and processing system for removing both anionic and cationic technetium complexes from an aqueous solution by adjusting the pH of the solution to greater than approximately 2, and directing the solution into an integrated resin and electrochemical plating device. The integrated resin and plating device has a resin bed or resin membrane in which is disposed one or more cathodes, and one or more anodes. A potential generator produces at least a 1 volt potential between the cathodes and the anodes. As the solution passes through the resin, the technetium complexes are adsorbed onto it. When a sufficient concentration of technetium complexes is adsorbed, the plating process can alternatively be driven to plate out the technetium onto the cathodes, or to collect various species in system anolytes/catholytes.

18 Claims, 3 Drawing Sheets

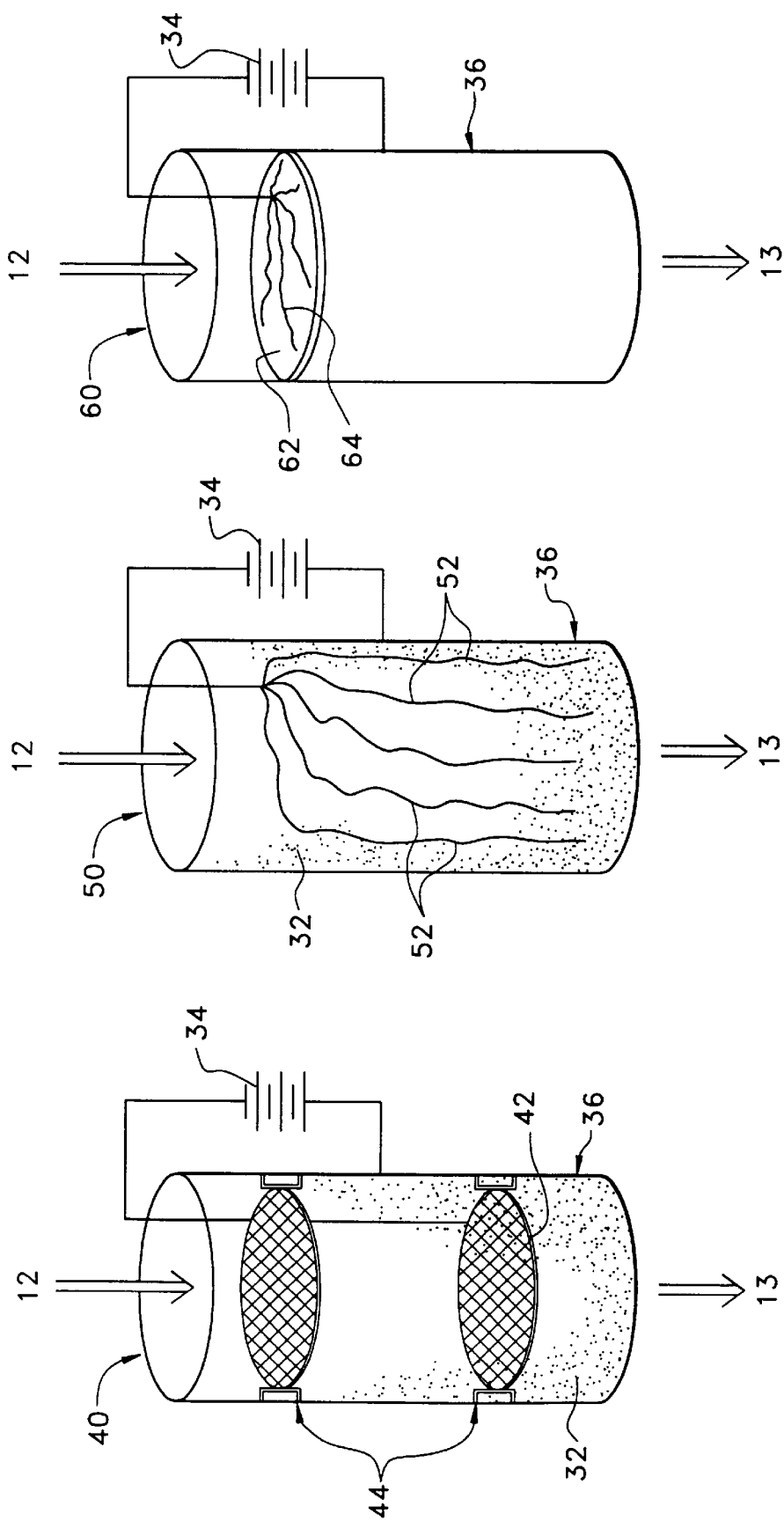

ROBUST TECHNETIUM REMOVAL METHOD AND SYSTEM

BACKGROUND OF THE INVENTION

1. Field of the Invention

The present invention relates to methods and systems for removing technetium from streams of material. More specifically, this invention relates to methods and systems for removing technetium of varying valences.

2. Description of the Related Art

The prior art discloses that technetium ("Tc") is a difficult material to remove from environmental and process discharge streams, including those of hydrometallurgical processing operations, because of the facts that: 1) Tc exists in multiple, stable valence states; and 2) Tc can change valence states when exposed to relatively mild oxidizing or reducing conditions relatively easily in comparison to other transition metals. See R. E. Wildung, L. M. McFadden, and T. R. Garland, "Technetium Sources and Behavior in the Environment," J. Environ. Qual., Vol. 8, no. 2, p. 156 (1979), incorporated herein by reference.

The prior art discloses using a solvent extraction/resin adsorption/ion exchange/crystallization method to remove the Tc. However, the Tc valence variations inhibit the necessary solvent extraction and/or resin adsorption efficiencies to reduce the Tc percentage in the stream to desired levels. The Tc valences can be controlled to an extent using relatively large additions of chemicals to adjust the pH, oxidation, or both. This results in increased removal processing costs and an increased secondary waste volume to process for disposal. Further, the repeated regeneration of the extraction resin is costly in itself, with the efficiency of the resin decreasing with each regeneration cycle. See Dow Chemical U.S.A., "Demineralization of Organically Contaminated Waters," Idea±Exchange, Vol. 8, No. 1.; and Rohm and Haas Company, Fluid Process Chemicals Department, "Recovery of Precious Metals with Amberlite Ion Exchange Resins," Amber-Hi-Lites, No. 171 (Autumn 1982), both of which are incorporated herein by reference.

Therefore a need exists to provide an efficient Tc removal method and system which is robust enough to remove Tc of various valences.

SUMMARY OF THE INVENTION

The invention provides a method and processing system for removing both anionic and cationic technetium complexes from an aqueous solution by adjusting the pH of the solution to greater than approximately 2, and directing the solution into an integrated resin and electrochemical plating device. The integrated resin and plating device has a resin bed or resin membrane in which is disposed one or more cathodes, and one or more anodes. A potential generator produces at least a 1 volt potential between the cathodes and the anodes. As the solution passes through the resin, the technetium complexes are adsorbed onto it. When a sufficient concentration of technetium complexes is adsorbed, the plating process can alternatively be driven to plate out the technetium onto the cathodes, or to collect various species in system anolytes/catholytes.

BRIEF DESCRIPTION OF THE DRAWINGS

FIG. 2 is an integrated resin bed/plating means with screen cathodes according to the present invention.

FIG. 3 is an integrated resin bed/plating means with wire cathodes according to the present invention.

FIG. 4 is an integrated resin membrane/plating means with the cathodes imbedded in the resin membrane according to the present invention.

DESCRIPTION OF THE PREFERRED EMBODIMENTS

Figure 1:
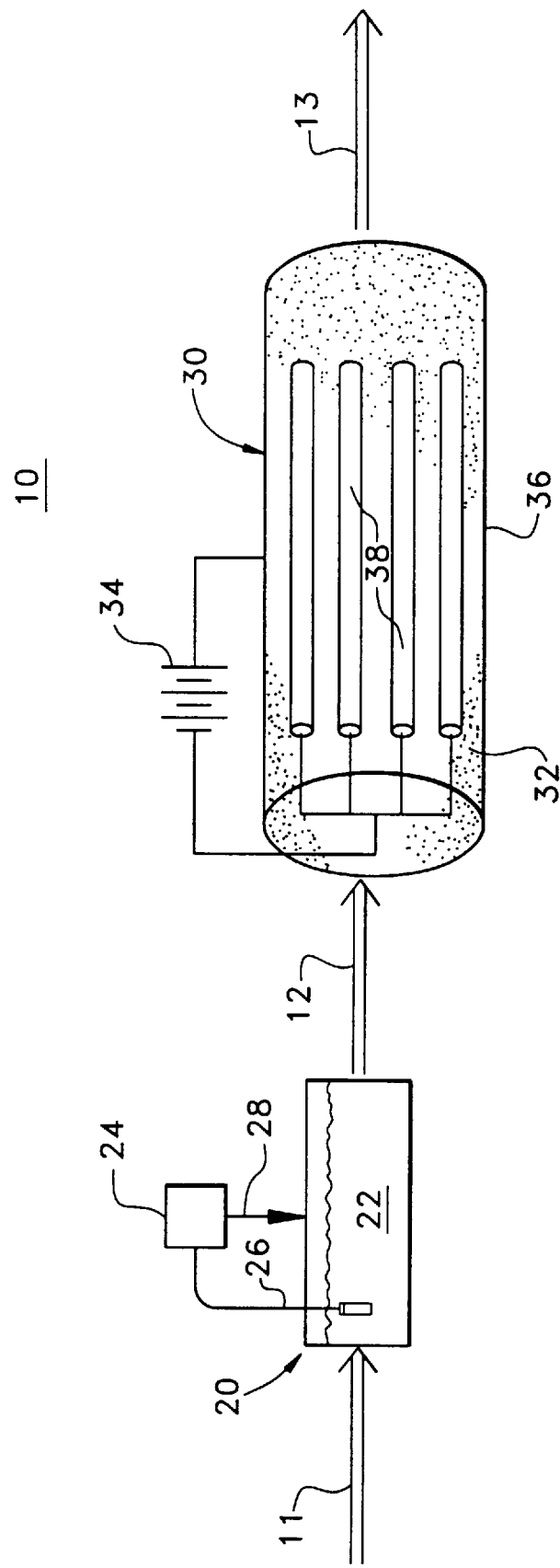
FIG. 1 is a schematic diagram of technetium removal by an integrated resin/plating system with cylindrical cathodes according to the present invention.

Referring to the drawings, wherein like reference numerals refer to like elements, and referring in particular to FIG. 1, an integrated resin/plating system 10 comprises a pH adjustment means 20 and an integrated resin bed/plating means 30. An incoming, technetium ("Tc")-laden process stream 11 is directed into the pH adjustment means 20, forming a charge of process liquid 22 therein. The Tc-laden process stream 11 comprises anionic and/or cationic Tc complexes. A pH measurement means 24 measures the pH of the charge of process liquid 22 with a pH probe 26. The pH adjustment means then adjusts the charge of process liquid with pH adjustment stream 28 to greater than approximately 2, if it is not that high already. In the embodiment of the invention shown in FIG. 1, the pH adjustment means 20 is a continuous-flow through pH adjustment system. In other embodiments of the invention, the pH of the Tc-laden process stream 11 may be adjusted by an in-line system, a batch system, or a semi-batch system. In still further embodiments of the invention, the pH probe 26 may be in stream 11 or an intermediate stream 12 exiting the pH adjustment means 20, thereby forming either a feed-forward control loop or a feed-backward control loop, respectively.

The intermediate process stream 12 is directed from the pH adjustment means 20 to the integrated resin bed/plating means 30 from where it exits as a Tc-reduced stream 13. In the embodiment of the invention shown in FIG. 1, the means 30 comprises a resin bed 32, a potential generating means 34, an inert anode 36, and a plurality of cylindrical cathodes 38 At least a portion of both the anionic and cationic Tc complexes in the intermediate process stream 12 plate out onto the cathodes 38. In the preferred embodiment of the invention, the potential generating means 34 generates a potential of greater than approximately 1 volt. The inert anode 36 also functions as a wall surrounding the resin bed 32 in the shown embodiment. Other embodiments of the invention may have other anode arrangements.

The kinetics of the plating process within the integrated resin bed/plating means 30 is such that residence time of the intermediate process stream 12 is too great for an appreciable portion of the Tc complexes therein to plate out efficiently without some other mechanism. To help drive the plating reaction, the resin bed 32 adsorbs both the anionic and cationic Tc complexes, thus placing a higher concentration of the Tc near the cathodes. In the preferred embodiment of the invention, the resin is a mixed bed of strong acid and strong base resins. As steady state is reached, the kinetics of the adsorption process approximately match the kinetics of the plating process.

A number of other benefits arise from the integrated resin/plating system 10. Tc valence is not a consideration as the means 30 plates out both cationic and anionic Tc complexes, eliminating the need for precise valence control systems. Trace levels of transition metal contaminants that exist in process streams can inhibit the plating process, such as hafnium and zirconium. The resin bed 32 extracts at least a portion of these trace transitional metals before they interfere with the plating process. The process of plating Tc on the cathode 38 continually depletes the resin of Tc, thus continually recharging the resin and increasing its apparent life and capacity. The cathodes 38 have a prolonged life as the Tc coating inhibits corrosion.

Other embodiments of the invention may have different integrated means for plating out Tc other than the integrated resin bed/plating means 30. Now referring to FIG. 2, an alternative embodiment of the invention may have a resin bed/plating means 40 comprising screen electrodes 42 disposed in the resin bed 32 instead of the cylindrical cathodes 38. In the embodiment shown, the screen electrodes 42 have approximately the same diameter as the resin bed 32. In the preferred embodiment, the screen electrodes 42 are held in place with insulators 44 that are attached to the inner surface of the inert anode 36 that forms the wall of the resin bed 32. Now referring to FIG. 3, an additional alternative embodiment of the invention may have an integrated resin bed/plating means 50 that plates the Tc complexes onto wire cathodes 52 disposed in the resin bed 32. Other embodiments of the invention may have other suitable cathode arrangements.

According to the embodiment of the invention as shown in FIG. 4, an integrated resin membrane/plating means 60 having a resin membrane 62 is another alternative to the integrated resin bed/plating means previously described. A Tc-adsorbing resin has been formed into a selective membrane 62 having a cathode 64 embedded therein. The cathode 64 may be similar to the previously mentioned wire cathode 52 or screen cathode 42, or any other suitable cathode design. The embodiment of the invention shown in FIG. 4 has one resin membrane 62 disposed across the latitudinal cross-section of the system 60, but other embodiments of the invention may have a plurality of selective membranes 62 disposed in the means 60. Still further embodiments of the invention may have resin membranes of other arrangements, such as in a bag or convoluted shape.

Figure 5:
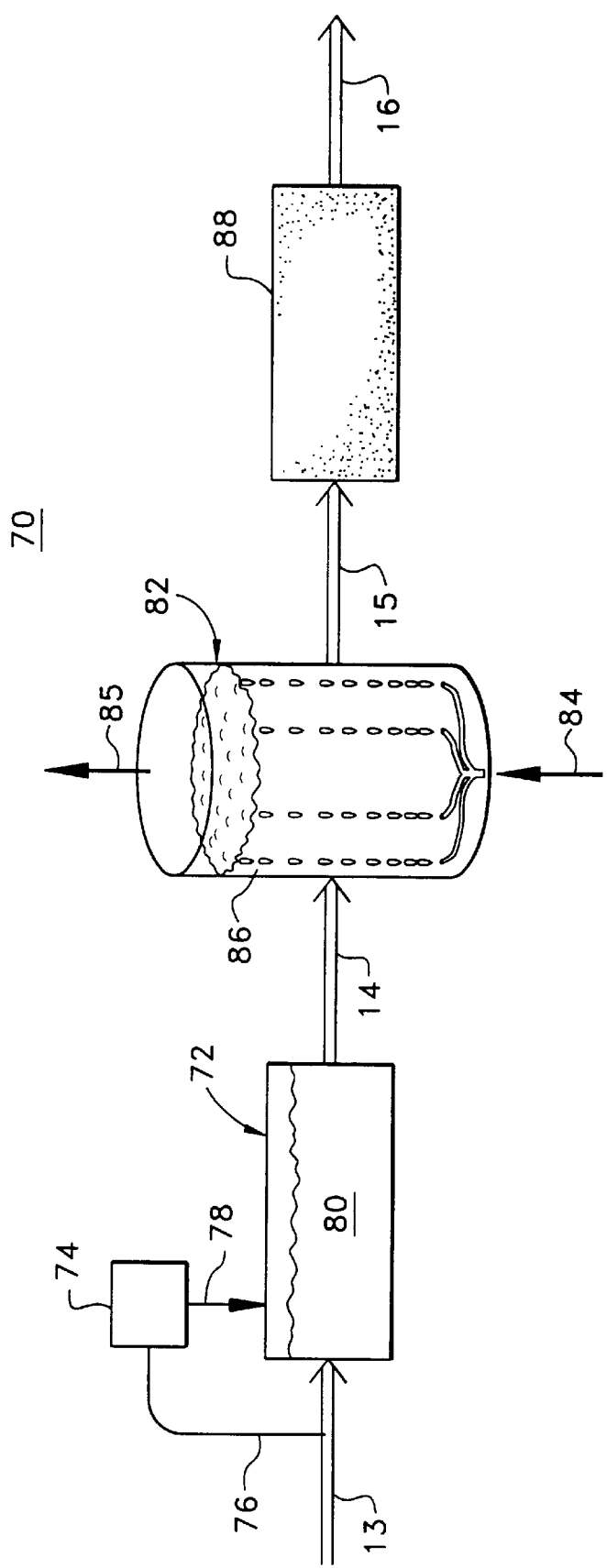
FIG. 5 is a schematic diagram of technetium removal by a technetium polishing system according to the present invention.

Now referring to FIG. 5, in an embodiment of the invention, the Tc-reduced stream 13 is directed into a Tc polishing system 70 to further reduce the Tc in the stream 13 without regard to the Tc valences therein. The Tc polishing system 70 comprises an oxidation means 72, an oxidant stripping means 82, and an anion exchange resin bed 88. The oxidation means 72 receives the Tc-reduced stream 13 into a charge of process liquid 80 and discharges a substantially anionic Tc-reduced stream 14 therefrom. The oxidation means 72 oxidizes the cationic Tc complexes in the charge 80 into anionic Tc complexes. This is accomplished by an oxidation adjustment means 74 measuring the oxidation potential of stream 13 with a probe 76. Based on the oxidation potential, the oxidation adjustment means 74 adds oxidant 78 to the charge of process liquid 80 to convert substantially all of the cationic Tc complexes therein to anionic Tc complexes. The oxidant 78 may be hydrogen peroxide, ozone, oxygen gas, permanganate or a nitric acid-nitrous acid mixture. However, the combination of nitrates and anion exchange resin is not recommended for use-particularly if other oxidants are present. In the embodiment of the invention shown in FIG. 5, the oxidation adjustment means 74 is a feed-forward control system for a continuous flow through oxidation means 72. Other embodiments of the invention may have the probe 76 in the charge of process fluid 80 or in a process stream 14 exiting from the oxidation means 72. Still further embodiments of the invention may have the stream 13 adjusted by an in-line system, a batch system, or a semi-batch system.

After exiting the oxidation adjustment means 72, the process stream 14 is directed to the oxidant stripping means 82 to strip out a substantial percentage of the oxidant in the stream and to produce a process stream 15 therefrom. The presence of oxidant in the process stream 15 is detrimental to the anion exchange resin bed 88 downstream of the means 82. The process stream 14 enters the oxidant stripping means 82 to form a charge of process liquid 86 therein. In the preferred embodiment of the invention, an air stream 84 is sparged through the charge of process liquid 86 and discharged as oxidant/air stream 85, thereby stripping the oxidant from the charge 86. The oxidant/air stream 85 may be directed to a scrubbing system (not shown). Other embodiments of the invention may use other suitable methods to strip the oxidant from the charge of process liquid 86.

After exiting the oxidant stripping system 82, the process stream 15, with its substantially anionic Tc complexes, flows through the anion exchange resin bed 88. Other embodiments of the invention may have multiple resin beds. The anion exchange resin bed 88 adsorbs at least a portion of the anionic Tc complexes onto resin to produce a substantially Tc-free stream 16 to exit therefrom. Still other embodiments of the invention may have other means to remove the anionic Tc complexes from stream 15. Still further embodiments of the invention may have the Tc-laden process stream 11 enter the Tc polishing system 70 directly as it is a robust system that can handle an incoming process stream having various valences of Tc.

Thus, the present invention provides a robust method and system for removing technetium of varying valences from a process stream. The method and system may be practiced with any of the integrated resin/plating system 10 combined with the Tc polishing system 70, or either system separately. Accordingly, the present invention may be embodied in other specific forms without departing from the spirit or essential attributes thereof and, accordingly, reference should be made to the appended claims, rather than to the foregoing specification, as indicating the scope of the invention.

We claim:

1. A method for removing anionic and cationic technetium complexes from a solution, comprising the steps of:
    a) adjusting the pH of the solution to greater than approximately 2;
    b) directing the solution through ion exchange means for adsorbing at least a portion of the anionic and cationic technetium complexes onto ion-exchange resin; and
    c) plating at least a portion of the adsorbed anionic and cationic technetium complexes onto one or more cathodes disposed in the ion exchange means by generating a potential between the cathodes and one or more inert anodes.

2. The method of claim 1, wherein the plating step further comprises the step of generating a potential of greater than approximately 1 volt between the cathodes and the inert anodes.

3. The method of claim 1, further comprising, after the plating step, the steps of:
    a) directing the solution out of the ion exchange means;
    b) determining an oxidation potential of the solution;
    c) converting at least a portion of the cationic technetium complexes in the solution to anionic technetium complexes by adding an amount of oxidizing agent to the solution based upon the oxidation potential of the solution;
    d) stripping at least a portion of the oxidizing agent from the solution; and e) removing at least a portion of anionic technetium complexes from the solution.

4. The method of claim 3, wherein:
a) the converting step further comprises the step of adding the amount of the oxidizing agent selected from hydrogen peroxide, ozone, oxygen gas, permanganate and a nitric acid-nitrous acid mixture; and
b) the stripping step further comprises stripping the portion of the oxidizing agent from the solution by sparging air into the solution.

5. The method of claim 3, wherein the removing step further comprises the step of directing the solution through resin bed means for adsorbing the portion of the anionic technetium complexes therefrom.

6. The method of claim 1, further comprising the steps of:
a) determining an oxidation potential of the solution;
b) converting at least a portion of the cationic technetium complexes to anionic technetium complexes by adding an amount of oxidizing agent to the solution based upon the oxidation potential of the solution;
c) stripping at least a portion of the oxidizing agent from the solution; and
d) removing at least a portion of anionic technetium complexes from the solution.

7. The method of claim 6, wherein:
a) the converting step further comprises the step of adding the amount of the oxidizing agent selected from hydrogen peroxide, ozone, oxygen gas, permanganate and a nitric acid-nitrous acid mixture; and
b) the stripping step further comprises stripping the portion of the oxidizing agent from the solution by sparging air into the solution.

8. The method of claim 6, wherein the removing step further comprises the step of directing the solution through resin bed means for adsorbing the portion of the anionic technetium complexes therefrom.

9. A technetium removal system for removing anionic and cationic technetium complexes from a solution, comprising:
a) pH adjustment means for adjusting the pH of the solution to greater than approximately 2;
b) adsorption means for receiving the solution from the pH adjustment means, adsorbing at least a portion of the anionic and cationic technetium complexes in the solution onto ion-exchange resin, and discharging the solution; and
c) plating means for generating a potential between one or more cathodes disposed in the ion-exchange resin, and at least one inert anode.

10. The system of claim 9, wherein the plating means further comprises means for generating a potential of greater than approximately 1 volt between the cathodes and the inert anodes.

11. The system of claim 9, wherein the ion-exchange resin forms a bed, the cathodes are screen, plate, cylindrical, or wire electrodes disposed in the bed, and the inert anode is a wall of the adsorption means that at least partially surrounds the bed.

12. The system of claim 9, wherein the ion-exchange resin forms at least one membrane with the cathodes embedded therein.

13. The system of claim 9, further comprising:
a) measurement means for determining the oxidation potential of the solution discharged from the adsorption means, and sending an oxidation potential signal;
b) converting means for receiving the oxidation potential signal and the solution from the measurement means, adding an amount of oxidizing agent to the solution, based on the oxidation potential signal, to convert at least a portion of the cationic technetium complexes therein to anionic technetium complexes, and discharging the solution;
c) stripping means for receiving the solution from the converting means, stripping at least a portion of the oxidizing agent therefrom, and discharging the solution; and
d) removal means for receiving the solution from the stripping means and removing at least a portion of the anionic technetium complexes therefrom.

14. The system of claim 13, wherein:
a) oxidizing agent is selected from hydrogen peroxide, ozone, oxygen gas, permanganate and a nitric acid-nitrous acid mixture; and
b) the stripping means further comprises means for sparging air into the solution.

15. The system of claim 13, wherein the removal means further comprises resin bed means for adsorbing the anionic technetium complexes from the solution.

16. The system according to claim 9, further comprising:
a) measurement means for determining the oxidation potential of the solution and sending an oxidation potential signal;
b) converting means for receiving the solution and the oxidation potential signal from the measurement means, adding an amount of oxidizing agent to the solution, based on the oxidation potential signal, to convert at least a portion of the cationic technetium complexes therein to anionic technetium complexes, and discharging the solution;
c) stripping means for receiving the solution from the converting means, stripping at least a portion of the oxidizing agent therefrom, and discharging the solution; and
d) removal means for receiving the solution from the stripping means and removing at least a portion of the anionic technetium complexes therefrom.

17. The system of claim 16, wherein:
a) the oxidizing agent is selected from hydrogen peroxide, ozone, oxygen gas, permanganate and a nitric acid-nitrous acid mixture; and
b) the stripping means further comprises means for sparging air into the solution.

18. The system of claim 16, wherein the removal means further comprises resin bed means for adsorbing the portion of the anionic technetium complexes from the solution.

* * * * *